US010521008B2

(12) United States Patent
Quay et al.

(10) Patent No.: US 10,521,008 B2
(45) Date of Patent: Dec. 31, 2019

(54) VIRTUAL REALITY DEVICE, METHOD FOR VIRTUAL REALITY, AND NON-TRANSITORY COMPUTER READABLE STORAGE MEDIUM

(71) Applicant: HTC Corporation, Taoyuan (TW)

(72) Inventors: Richard Herbert Quay, Seattle, WA (US); David Brinda, Bellevue, WA (US); Dennis Todd Harrington, Seattle, WA (US); Elbert Stephen Perez, Seattle, WA (US); Weston Page Vierregger, Seattle, WA (US)

(73) Assignee: HTC CORPORATION, Taoyuan (TW)

( * ) Notice: Subject to any disclaimer, the term of this patent is extended or adjusted under 35 U.S.C. 154(b) by 91 days.

(21) Appl. No.: 15/487,609

(22) Filed: Apr. 14, 2017

(65) Prior Publication Data

US 2017/0300110 A1    Oct. 19, 2017

Related U.S. Application Data

(60) Provisional application No. 62/322,767, filed on Apr. 14, 2016.

(51) Int. Cl.
*G06F 3/01* (2006.01)
*G06T 11/60* (2006.01)
*G06F 3/03* (2006.01)
*G06F 3/048* (2013.01)

(52) U.S. Cl.
CPC .............. *G06F 3/011* (2013.01); *G06F 3/03* (2013.01); *G06T 11/60* (2013.01); *G06F 3/048* (2013.01)

(58) Field of Classification Search
CPC .......... G06F 3/011; G06F 3/048; G06T 11/60
See application file for complete search history.

(56) References Cited

U.S. PATENT DOCUMENTS

| | | | |
|---|---|---|---|
| 2011/0210962 A1* | 9/2011 | Horan | G06T 15/20 345/419 |
| 2015/0049083 A1* | 2/2015 | Bidne | G06T 19/006 345/420 |
| 2015/0352437 A1* | 12/2015 | Koseki | A63F 13/212 463/31 |
| 2016/0350977 A1* | 12/2016 | Doronichev | H04W 4/21 |
| 2017/0076502 A1* | 3/2017 | Chen | G06T 19/006 |

* cited by examiner

*Primary Examiner* — Towfiq Elahi
(74) *Attorney, Agent, or Firm* — McClure, Qualey & Rodack, LLP

(57) ABSTRACT

A method for virtual reality (VR) includes displaying a VR viewfinder illustrating a preview image corresponding to a portion of a VR environment, sensing a first actuation movement of a VR controller for photographing, and capturing a VR photograph corresponding to the preview image illustrated in the VR viewfinder in response to the first actuation movement of the VR controller for photographing being sensed.

14 Claims, 7 Drawing Sheets

VIRTUAL REALITY DEVICE, METHOD FOR VIRTUAL REALITY, AND NON-TRANSITORY COMPUTER READABLE STORAGE MEDIUM

RELATED APPLICATIONS

This application claims priority to Application Ser. No. 62/322,767 filed Apr. 14, 2016, which is herein incorporated by reference.

BACKGROUND

Technical Field

The present disclosure relates to an electronic device and a method. More particularly, the present disclosure relates to a virtual reality device and a method for virtual reality.

Description of Related Art

With advances in electronic technology, virtual reality (VR) systems are being increasingly used.

A VR system may provide a user interface to a user to allow the user to interact with the VR system. Hence, how to design a user friendly interface is an important area of research in this field.

SUMMARY

One aspect of the present disclosure is related to a method for virtual reality (VR). In accordance with one embodiment of the present disclosure, the method includes displaying a VR viewfinder illustrating a preview image corresponding to a portion of a VR environment, sensing a first actuation movement of a VR controller for photographing, and capturing a VR photograph corresponding to the preview image illustrated in the VR viewfinder in response to the first actuation movement of the VR controller for photographing being sensed.

In accordance with one embodiment of the present disclosure, under a photo mode, the VR viewfinder illustrates a photo preview image corresponding to a first portion of the VR environment; and under a selfie mode, the VR viewfinder illustrates a selfie preview image corresponding to a second portion of the VR environment.

In accordance with one embodiment of the present disclosure, the first portion of the VR environment and the second portion of the VR environment are on opposite directions of the VR viewfinder.

In accordance with one embodiment of the present disclosure, the method further includes sensing a second actuation movement of the VR controller corresponding to a camera widget in the VR environment. The VR viewfinder is displayed in response to the second actuation movement of the VR controller corresponding to the camera widget in the VR environment being sensed.

In accordance with one embodiment of the present disclosure, the method further includes sensing a moving movement of the VR controller corresponding to the VR viewfinder, and moving the VR viewfinder in response to the moving movement of the VR controller corresponding to the VR viewfinder, so that the VR viewfinder illustrates the preview image corresponding to another portion of the VR environment.

In accordance with one embodiment of the present disclosure, the method further includes sensing a third actuation movement of the VR controller corresponding to the VR viewfinder and a certain place in the VR environment when the VR viewfinder is moving, and locking the moving VR viewfinder at the certain place in the VR environment in response to the third actuation movement of the VR controller corresponding to the VR viewfinder and the certain place in the VR environment.

In accordance with one embodiment of the present disclosure, the method further includes displaying the captured VR photograph in a picture frame, and changing the photograph in the picture frame in response to a fourth actuation movement of the VR controller corresponding to the picture frame.

Another aspect of the present disclosure is related to a virtual reality (VR) device. In accordance with one embodiment of the present disclosure, the VR includes one or more processing components, memory electrically connected to the one or more processing components, and one or more programs. The one or more programs are stored in the memory and configured to be executed by the one or more processing components. The one or more programs includes instructions for controlling a VR display device for displaying a VR viewfinder illustrating a preview image corresponding to a portion of a VR environment, sensing a first actuation movement of a VR controller for photographing, and capturing a VR photograph corresponding to the preview image illustrated in the VR viewfinder in response to the first actuation movement of the VR controller for photographing being sensed.

In accordance with one embodiment of the present disclosure, under a photo mode, the VR viewfinder illustrates a photo preview image corresponding to a first portion of the VR environment; and under a selfie mode, the VR viewfinder illustrates a selfie preview image corresponding to a second portion of the VR environment.

In accordance with one embodiment of the present disclosure, the first portion of the VR environment and the second portion of the VR environment are on opposite directions of the VR viewfinder.

In accordance with one embodiment of the present disclosure, the VR device includes instructions for sensing a second actuation movement of the VR controller corresponding to a camera widget in the VR environment. The VR viewfinder is displayed in response to the second actuation movement of the VR controller corresponding to the camera widget in the VR environment being sensed.

In accordance with one embodiment of the present disclosure, the VR device includes instructions for sensing a moving movement of the VR controller corresponding to the VR viewfinder, and moving the VR viewfinder in response to the moving movement of the VR controller corresponding to the VR viewfinder, so that the VR viewfinder illustrates the preview image corresponding to another portion of the VR environment.

In accordance with one embodiment of the present disclosure, the VR device includes instructions for sensing a third actuation movement of the VR controller corresponding to the VR viewfinder and a certain place in the VR environment when the VR viewfinder is moving, and locking the moving VR viewfinder at the certain place in the VR environment in response to the third actuation movement of the VR controller corresponding to the VR viewfinder and the certain place in the VR environment.

In accordance with one embodiment of the present disclosure, the VR device includes instructions for controlling the VR display device for displaying the captured VR photograph in a picture frame, and changing the photograph in the picture frame in response to a fourth actuation movement of the VR controller corresponding to the picture frame.

Another aspect of the present disclosure is related to a non-transitory computer readable storage medium. In accordance with one embodiment of the present disclosure, the non-transitory computer readable storage medium stores one or more programs including instructions, which when executed, causes one or more processing components to perform operations including controlling a virtual reality (VR) display device for displaying a VR viewfinder illustrating a preview image corresponding to a portion of a VR environment, sensing a first actuation movement of a VR controller for photographing, and capturing a VR photograph corresponding to the preview image illustrated in the VR viewfinder in response to the first actuation movement of the VR controller for photographing being sensed.

In accordance with one embodiment of the present disclosure, under a photo mode, the VR viewfinder illustrates a photo preview image corresponding to a first portion of the VR environment; and under a selfie mode, the VR viewfinder illustrates a selfie preview image corresponding to a second portion of the VR environment.

In accordance with one embodiment of the present disclosure, the first portion of the VR environment and the second portion of the VR environment are on opposite directions of the VR viewfinder.

In accordance with one embodiment of the present disclosure, the non-transitory computer readable storage medium includes instructions, which when executed, causes one or more processing components to further perform operations including sensing a second actuation movement of the VR controller corresponding to a camera widget in the VR environment. The VR viewfinder is displayed in response to the second actuation movement of the VR controller corresponding to the camera widget in the VR environment being sensed.

In accordance with one embodiment of the present disclosure, the non-transitory computer readable storage medium includes instructions, which when executed, causes one or more processing components to further perform operations including sensing a moving movement of the VR controller corresponding to the VR viewfinder, and moving the VR viewfinder in response to the moving movement of the VR controller corresponding to the VR viewfinder, so that the VR viewfinder illustrates the preview image corresponding to another portion of the VR environment.

In accordance with one embodiment of the present disclosure, the non-transitory computer readable storage medium includes instructions, which when executed, causes one or more processing components to further perform operations including sensing a third actuation movement of the VR controller corresponding to the VR viewfinder and a certain place in the VR environment when the VR viewfinder is moving, and locking the moving VR viewfinder at the certain place in the VR environment in response to the third actuation movement of the VR controller corresponding to the VR viewfinder and the certain place in the VR environment.

Through the operations of one embodiment described above, a user friendly camera interface in a VR environment can be implemented.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
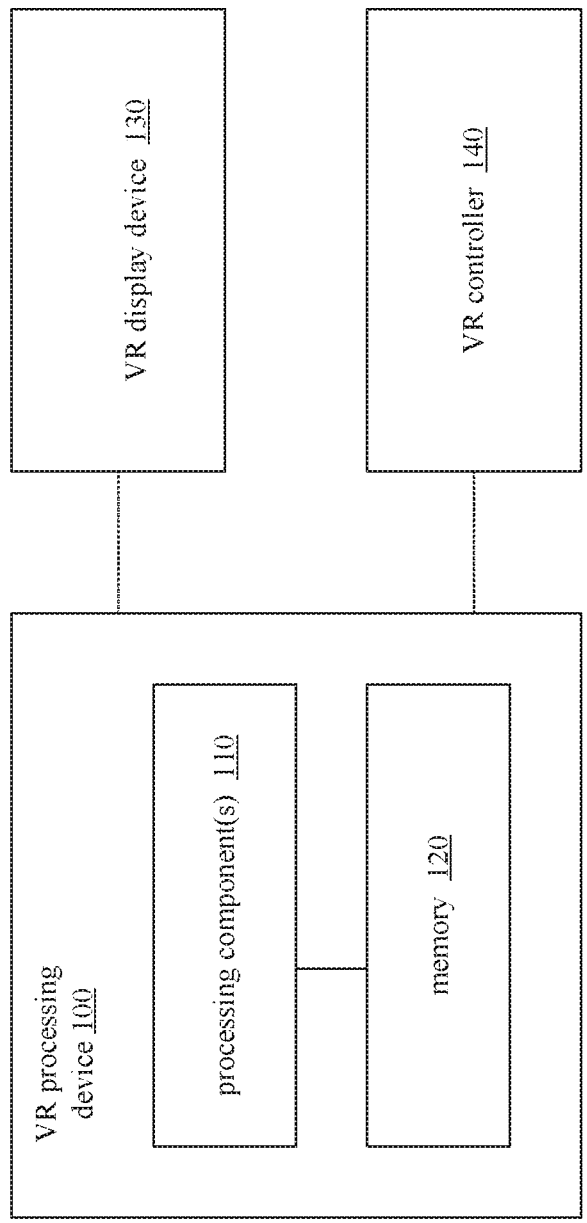
FIG. 1 is a schematic block diagram of a virtual reality (VR) system in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

FIG. 1 is a schematic block diagram of a virtual reality (VR) system 10 in accordance with one embodiment of the present disclosure. In this embodiment, the VR system 10 includes a VR processing device 100, a VR display device 130, and a VR controller 140. In one embodiment, the VR processing device 100 may electrically connected to the VR display device 130 and the VR controller 140 via wired or wireless connection. In one embodiment, the VR processing device 100 may be integrated with the VR display device 130 or the VR controller 140, and the present disclosure is not limited to the embodiment described herein. In one embodiment, the VR system 10 may include more than one VR controllers.

In one embodiment, the VR system 10 may further includes base stations (not shown) for positioning the VR display device 130 and/or the VR controller 140 and/or detecting tilt angles (e.g., rotating angles) of the VR display device 130 and/or the VR controller 140. However, another positioning method is within the contemplated scope of the present disclosure.

In one embodiment, the VR processing device 100 includes one or more processing components 110 and a memory 120. In this embodiment, the one or more processing component 110 are electrically connected to the memory 120. In one embodiment, the VR processing device 100 may further include signal transceivers for transmitting and receiving signals between the VR processing device 100 and the VR display device 130 and/or signals between the VR processing device 100 and the VR controller 140.

In one embodiment, the one or more processing components 110 can be realized by, for example, one or more processors, such as central processors and/or microprocessors, but are not limited in this regard. In one embodiment, the memory 120 includes one or more memory devices, each of which comprises, or a plurality of which collectively comprise a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this invention pertains. The VR display device 130 can be realized by, for example, a display, such as a liquid crystal display, or an active matrix organic light emitting display (AMOLED), but is not limited in this regard. The VR controller 140 can be realized by, for example, a handheld controller, such as a controller for Vive or a controller for Gear, but is not limited in this regard.

In one embodiment, the one or more processing components 110 may run or execute various software programs and/or sets of instructions stored in memory 120 to perform various functions for the VR processing device 100 and to process data.

In one embodiment, the one or more processing components 110 can sense movements of the VR controller 140, and control the VR display device 130 to display corresponding to the movements of the VR controller 140.

Figure 2:
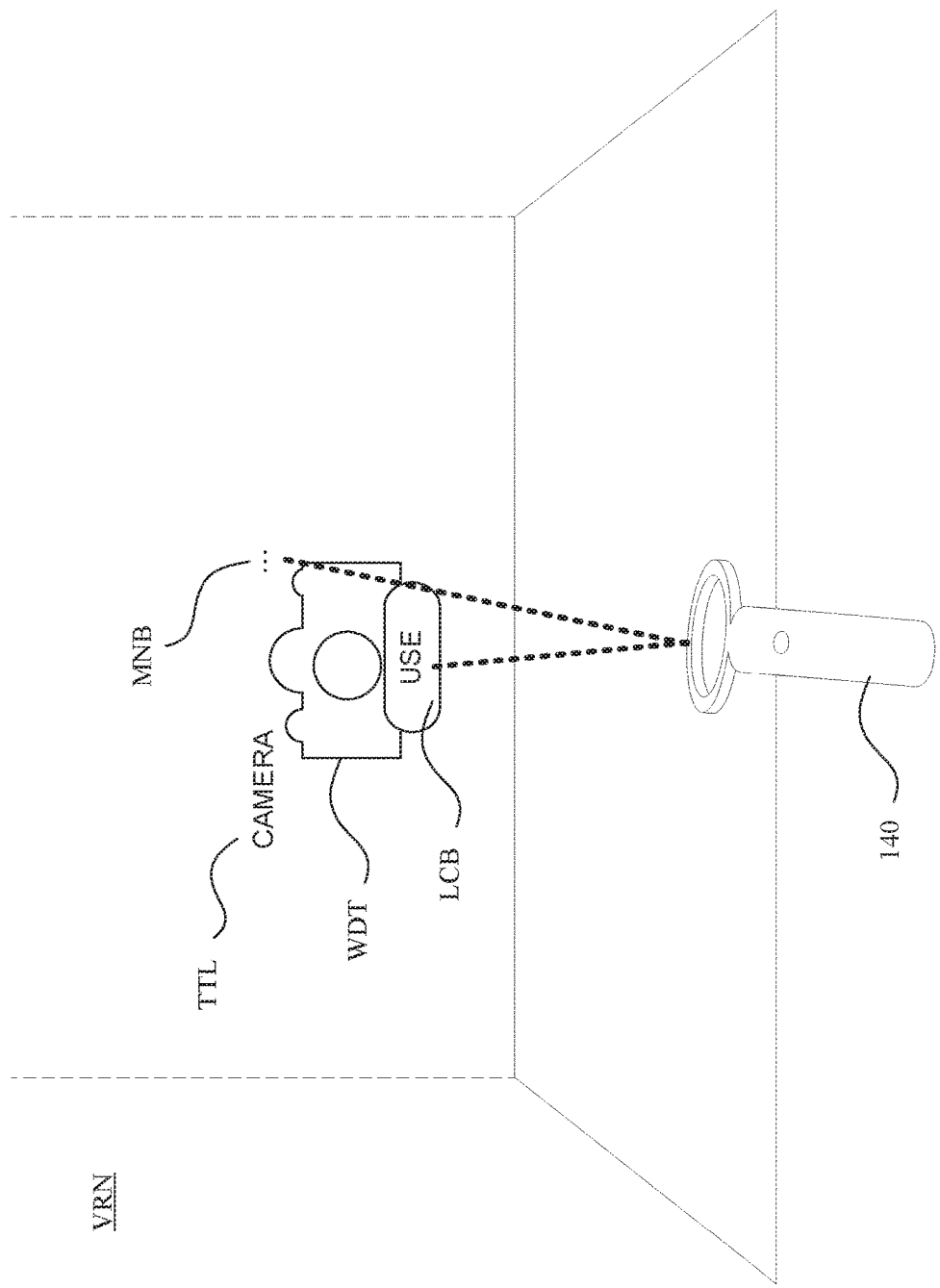
FIG. 2 illustrates an illustrative example of the VR system in accordance with one embodiment of the present disclosure.

Reference is made to FIG. 2. In one embodiment, the one or more processing components 110 can control the VR display device 130 to display a plurality of widgets in a VR environment VRN, including a camera widget WDT. In one embodiment, the one or more processing components 110 can control the VR display device 130 to display a title TTL, a launch button LCB, and/or a menu button MNB corresponding to the camera widget WDT.

In one embodiment, the one or more processing components 110 can sense an actuation movement of the VR controller 140 corresponding to the camera widget WDT in the VR environment VRN for launching the camera widget WDT. In one embodiment, the actuation movement of the VR controller 140 corresponding to the camera widget WDT may be a click of a trigger (e.g., a button) of the VR controller 140 aiming at the launch button LCB corresponding to the camera widget WDT, but another manner is within the contemplated scope of the present disclosure.

Figure 3:
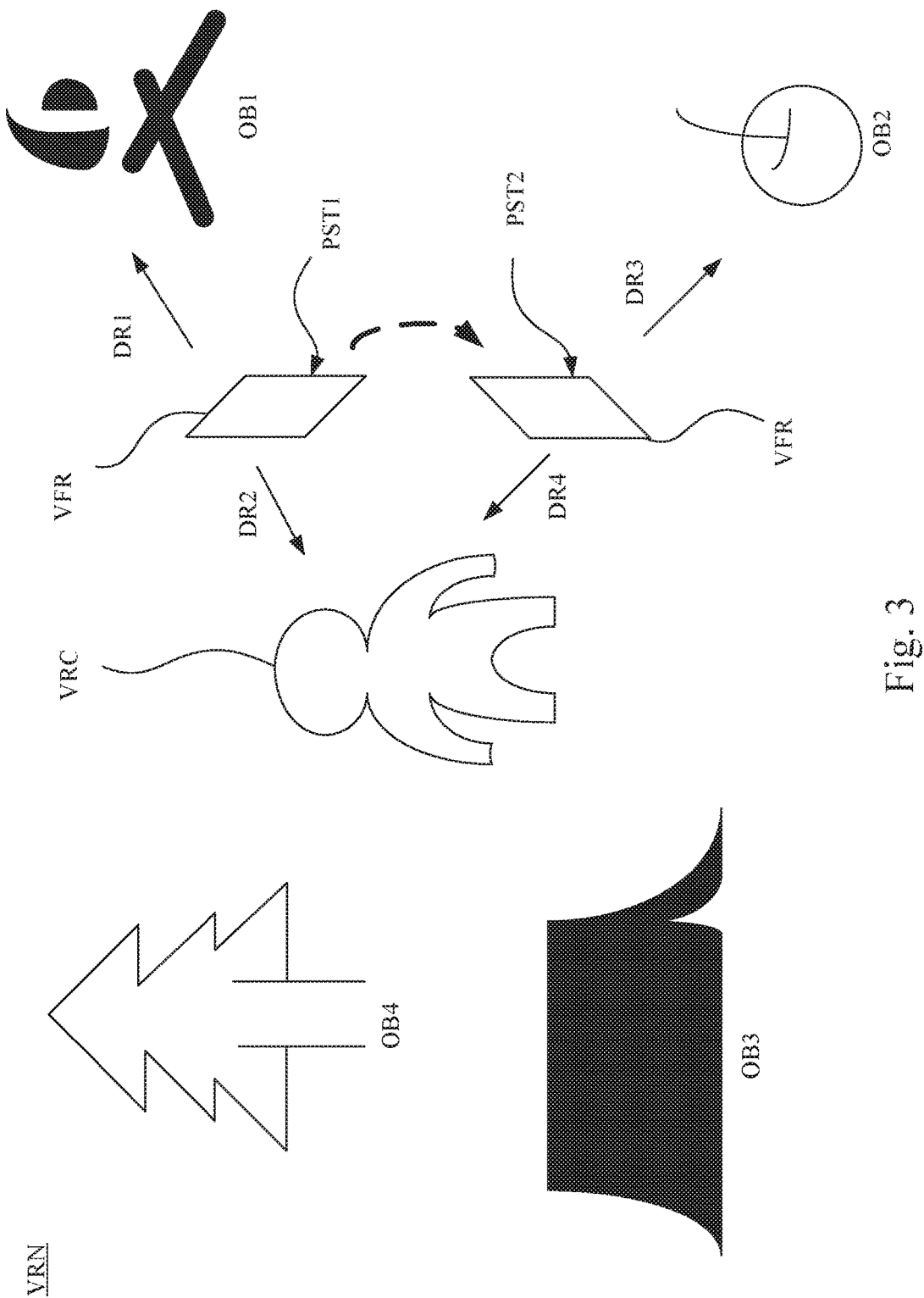
FIG. 3 illustrates an illustrative example of the VR system in accordance with one embodiment of the present disclosure.
Figure 4:
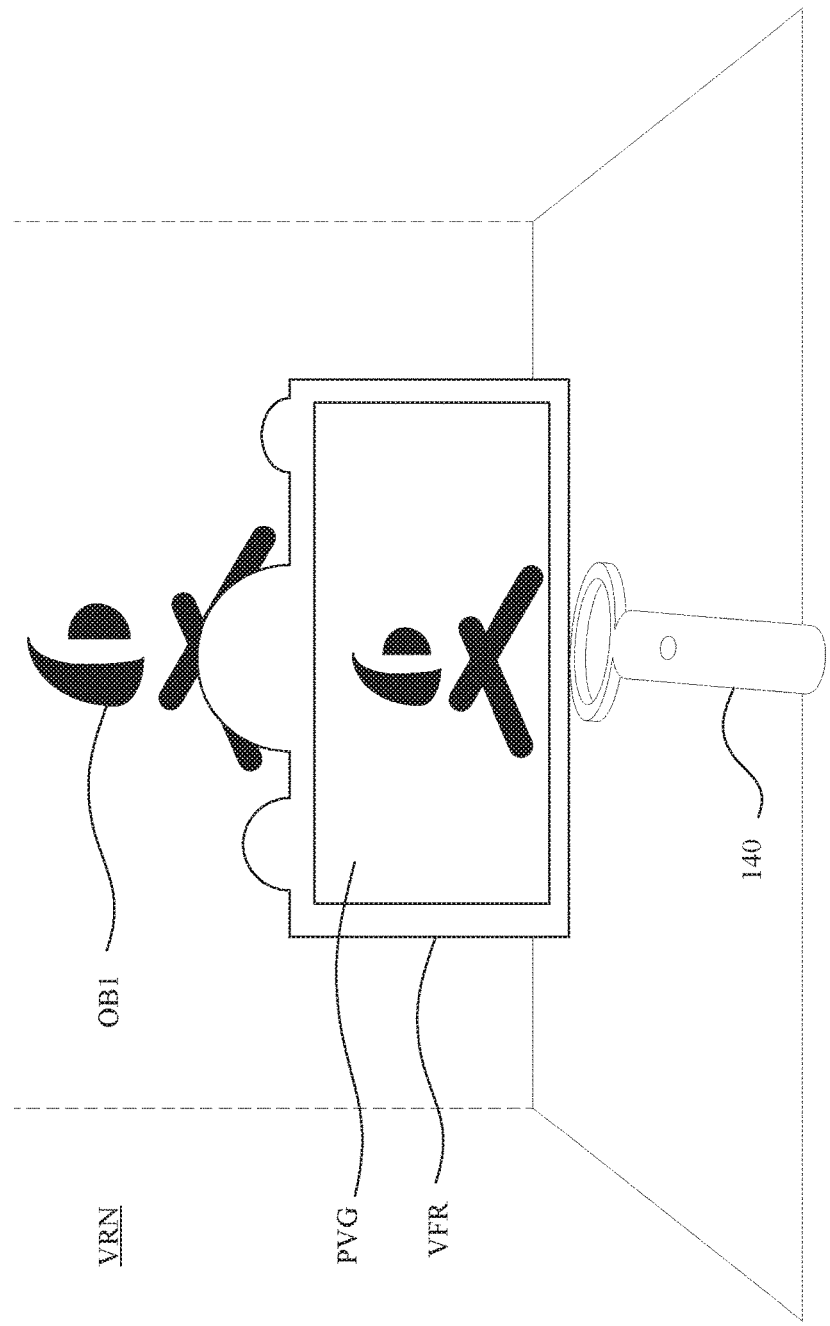
FIG. 4 illustrates an illustrative example of the VR system in accordance with one embodiment of the present disclosure.

Reference is also made to FIGS. 3 and 4. In one embodiment, in response to the actuation movement of the VR controller 140 corresponding to the camera widget WDT being sensed, the one or more processing components 110 can launch the camera widget WDT and control the VR display device 130 to display a VR viewfinder VFR illustrating a preview image PVG corresponding to a portion of the VR environment VRN (see FIG. 4).

For example, when the VR viewfinder VFR is directed toward a VR object OB1 in the VR environment VRN, the VR viewfinder VFR may illustrate the preview image PVG with the VR object OB1 in the VR environment VRN. When the VR viewfinder VFR is directed toward a VR object OB2 in the VR environment VRN (see FIG. 3), the VR viewfinder VFR may illustrate the preview image PVG with the VR object OB2 in the VR environment VRN.

In one embodiment, the VR viewfinder VFR has an outline identical to the outline of the camera widget WDT, so that a user can understand that the VR viewfinder VFR is related to the camera widget WDT.

In one embodiment, after the VR viewfinder VFR and the preview image PVG is displayed, the one or more processing components 110 can sense an actuation movement of the VR controller 140 for photographing. In one embodiment, the actuation movement of the VR controller 140 for photographing may be a click of a trigger (e.g., a button) of the VR controller 140 aiming at anywhere after the VR viewfinder VFR and the preview image PVG is displayed, but another manner is within the contemplated scope of the present disclosure.

In one embodiment, in response to the actuation movement of the VR controller 140 for photographing being sensed, the one or more processing components 110 can capture a VR photograph corresponding to the preview image PVG illustrated in the VR viewfinder VFR.

Through the operations described above, a user friendly camera interface in a VR environment can be implemented.

In one embodiment, after the VR viewfinder VFR and the preview image PVG is displayed, the one or more processing components 110 can sense a moving movement of the VR controller 140 corresponding to the VR viewfinder VFR for moving the VR viewfinder VFR.

In one embodiment, the moving movement of the VR controller 140 corresponding to the VR viewfinder VFR for moving the VR viewfinder VFR may include a change of a position and/or tilt angles of the VR controller 140 when the VR viewfinder VFR is in a moving mode. In one embodiment, the VR viewfinder VFR may be in the moving mode as the camera widget WDT is launched, until the VR viewfinder VFR is locked at a certain place in the VR environment VRN. In another embodiment, the VR viewfinder VFR may enter the moving mode in response to an actuation of the VR controller 140 corresponding to a moving button (not shown) of the VR viewfinder VFR for moving the VR viewfinder VFR.

Additionally, in one embodiment, the moving movement of the VR controller 140 corresponding to the VR viewfinder VFR for moving the VR viewfinder VFR may include a dragging movement of the VR controller 140 that drags the VR viewfinder VFR from one place to another, but another manner is within the contemplated scope of the present disclosure. In one embodiment, the dragging movement of the VR controller 140 may include changing the position and/or the tilt angles of the VR controller 140 with pressing and holding a trigger (e.g., a button) of the VR controller 140 corresponding to the VR viewfinder VFR.

In one embodiment, in response to the moving movement of the VR controller 140 for moving the VR viewfinder VFR being sensed, the one or more processing components 110 can move the VR viewfinder VFR, so that the VR viewfinder VFR illustrates the preview image PVG corresponding to another portion of the VR environment VRN. For example, when the VR viewfinder VFR is moved from the position PST1 with the direction DR1 to the position PST2 with the direction DR3, the preview image PVG may be changed from containing the VR object OB1 to containing the VR object OB2.

In one embodiment, when the VR viewfinder VFR is moving, the one or more processing components 110 can sense an actuation movement of the VR controller 140 corresponding to the VR viewfinder VFR and a certain place in the VR environment VRN for locking the moving VR viewfinder VFR at the certain place.

In one embodiment, under a condition that the VR viewfinder VFR is moved in the moving mode described above, the locking movement of the VR controller 140 for locking the moving VR viewfinder VFR at the certain place in the VR environment VRN may be a click of a trigger (e.g., a button) of the VR controller 140 aiming at the certain place in the VR environment VRN.

In one embodiment, under a condition that the VR viewfinder VFR is moved by the dragging movement of the VR controller 140 described above, the locking movement of the VR controller 140 for locking the moving VR viewfinder VFR at the certain place in the VR environment VRN may be a release of the held trigger of the VR controller 140 when the VR controller 140 is aiming at the certain place in the VR environment VRN.

It should be noted that, another manner for implementing the locking movement described above is within the contemplated scope of the present disclosure.

In one embodiment, in response to the actuation movement of the VR controller 140 for locking the moving VR viewfinder VFR at the certain place in the VR environment VRN being sensed, the one or more processing components 110 can lock the VR viewfinder VFR at the certain place, so that the one or more processing components 110 stop changing the place and the direction of the VR viewfinder VFR corresponding to the VR controller 140.

In one embodiment, the actuation movement of the VR controller 140 for photographing described above is sensed after the VR viewfinder VFR is locked at the certain place, and the one or more processing components 110 can correspondingly capture a VR photograph corresponding to the present preview image PVG illustrated in the locked VR viewfinder VFR.

In one embodiment, there are two different modes of the camera widget WDT. Under a photo mode, the VR viewfinder VFR illustrates a photo preview image corresponding to a portion of the VR environment VRN that is behind the VR viewfinder VFR, and the one or more processing components 110 capture the VR photograph corresponding to the photo preview image in response to the actuation for photographing. Under a selfie mode, the VR viewfinder VFR illustrates a selfie preview image corresponding to a portion of the VR environment VRN that is facing the VR viewfinder VFR, and the one or more processing components 110 capture the VR photograph corresponding to the selfie preview image in response to the actuation for photographing.

For example, particularly referring to FIG. 3, under a photo mode, when the VR viewfinder VFR is placed at the position PST1 and the back of the VR viewfinder VFR is directed toward the VR object OB1 (e.g., directed toward the direction DR1), the VR viewfinder VFR illustrates a photo preview image containing the VR object OB1, and a captured VR photograph will be a VR photograph containing the VR object OB1. Under a selfie mode, when the VR viewfinder VFR is placed at the position PST1, facing toward the VR character of the user and the VR object OB3 (e.g., facing toward the direction DR2), and back toward the VR object OB1 (e.g., back toward the direction DR1), the VR viewfinder VFR illustrates a selfie preview image containing the VR character VRC of the user and the VR object OB3, and a captured VR photograph will be a VR selfie containing the VR character VRC of the user and the VR object OB3.

Additionally, under a photo mode, when the VR viewfinder VFR is placed at the position PST2 and the back of the VR viewfinder VFR is directed toward the VR object OB2 (e.g., directed toward the direction DR3), the VR viewfinder VFR illustrates a photo preview image containing the VR object OB2, and a captured VR photograph will be a VR photograph containing the VR object OB2. Under a selfie mode, when the VR viewfinder VFR is placed at the position PST2, facing toward the VR character of the user and the VR object OB4 (e.g., facing toward the direction DR4), and back toward the VR object OB2 (e.g., back toward the direction DR3), the VR viewfinder VFR illustrates a selfie preview image containing the VR character VRC of the user and the VR object OB4, and a captured VR photograph will be the VR selfie containing the VR character VRC of the user and the VR object OB4.

In one embodiment, the portion of the VR environment illustrated in the photo preview image and the portion of the VR environment illustrated in the selfie preview image are on opposite directions of the VR viewfinder VFR, but the present disclosure is not limited in this regard.

In one embodiment, in response to an actuation movement of the VR controller 140 corresponding to a VR selfie trigger in the VR environment VRN for launching the camera widget WDT with the selfie mode being sensed, the one or more processing components 110 may launch the camera widget WDT with the selfie mode. In one embodiment, the VR selfie trigger may be illustrated as a selfie stick, but is not limited in this regard. In one embodiment, the actuation movement of the VR controller 140 corresponding to the VR selfie trigger for launching the camera widget WDT with the selfie mode may be a click of a trigger (e.g., a button) of the VR controller 140 aiming at the VR selfie trigger, but another manner is within the contemplated scope of the present disclosure.

In one embodiment, under a condition that the camera widget WDT is operated with the photo mode, in response to an actuation movement of the VR controller 140 corresponding to a switching button for switching the operating mode of the camera widget WDT being sensed, the one or more processing components 110 may convert the photo mode to the selfie mode. In one embodiment, the switching button may be illustrated corresponding to the VR viewfinder VFR, but is not limited in this regard. In one embodiment, the actuation movement of the VR controller 140 corresponding to the switching button for switching the operating mode of the camera widget WDT may be a click of a trigger (e.g., a button) of the VR controller 140 aiming at the switching button, but another manner is within the contemplated scope of the present disclosure.

Figure 5:
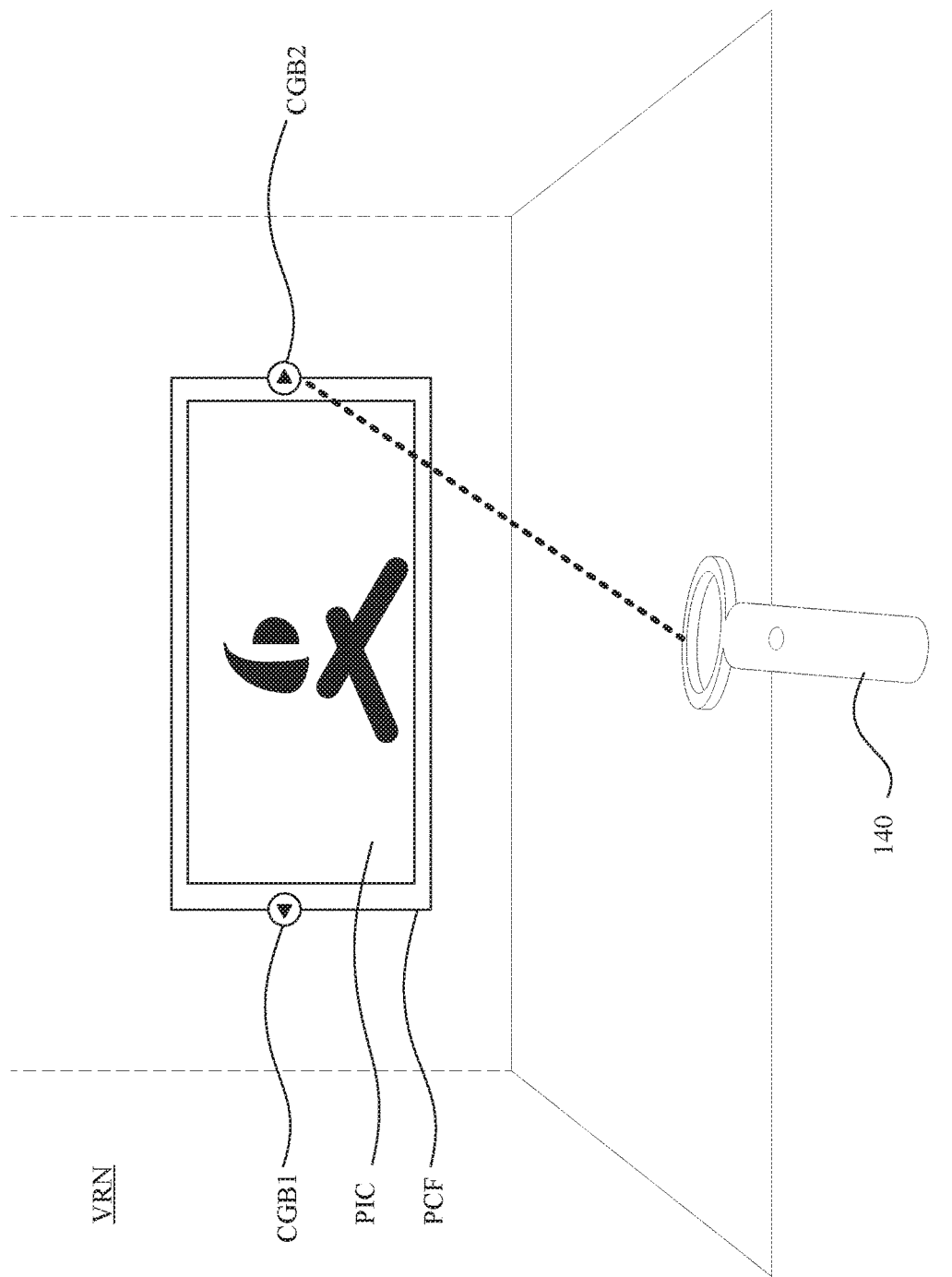
FIG. 5 illustrates an illustrative example of the VR system in accordance with one embodiment of the present disclosure.

Reference is made to FIG. 5. In one embodiment, the one or more processing components 110 may control the VR display device 130 to display the captured VR photograph PIC in a picture frame PCF in the VR environment VRN. In one embodiment, the outline of the picture frame PCF is different from the outline of the VR viewfinder VFR, so as to avoid the user mistaking the captured VR photograph PIC as the preview image PVG.

In one embodiment, the one or more processing components 110 may control the VR display device 130 to display a next button CGB1 and a previous button CGB2 on the picture frame PCF. In one embodiment, in response to an actuation movement of the VR controller 140 corresponding to the picture frame PCF for changing a photograph being sensed, the one or more processing components 110 may change the captured VR photograph PIC displayed in the picture frame PCF to another captured VR photograph.

In one embodiment, the actuation movement of the VR controller 140 corresponding to the picture frame PCF for changing a photograph may include a click of a trigger (e.g., a button) of the VR controller 140 aiming at the next button CGB1 or previous button CGB2, but another manner is within the contemplated scope of the present disclosure. In one embodiment, when a user clicks on the next button CGB1 by using the VR controller 140, a VR photograph captured next to the captured VR photograph PIC which is presently displayed would be displayed in the picture frame PCF. When the user clicks on the previous button CGB2 by using the VR controller 140, a VR photograph captured previous to the captured VR photograph PIC which is presently displayed would be displayed in the picture frame PCF.

In one embodiment, the actuation movement of the VR controller 140 corresponding to the picture frame PCF for changing a photograph may include a swipe movement of the VR controller 140 on the captured VR photograph PIC. For example, when a user swipes from left to right by using the VR controller 140 on the captured VR photograph PIC, a VR photograph captured next to the captured VR photograph PIC would be displayed in the picture frame PCF. When a user swipes from right to left by using the VR controller 140 on the captured VR photograph PIC, a VR photograph captured previous to the captured VR photograph PIC would be displayed in the picture frame PCF.

Figure 6:
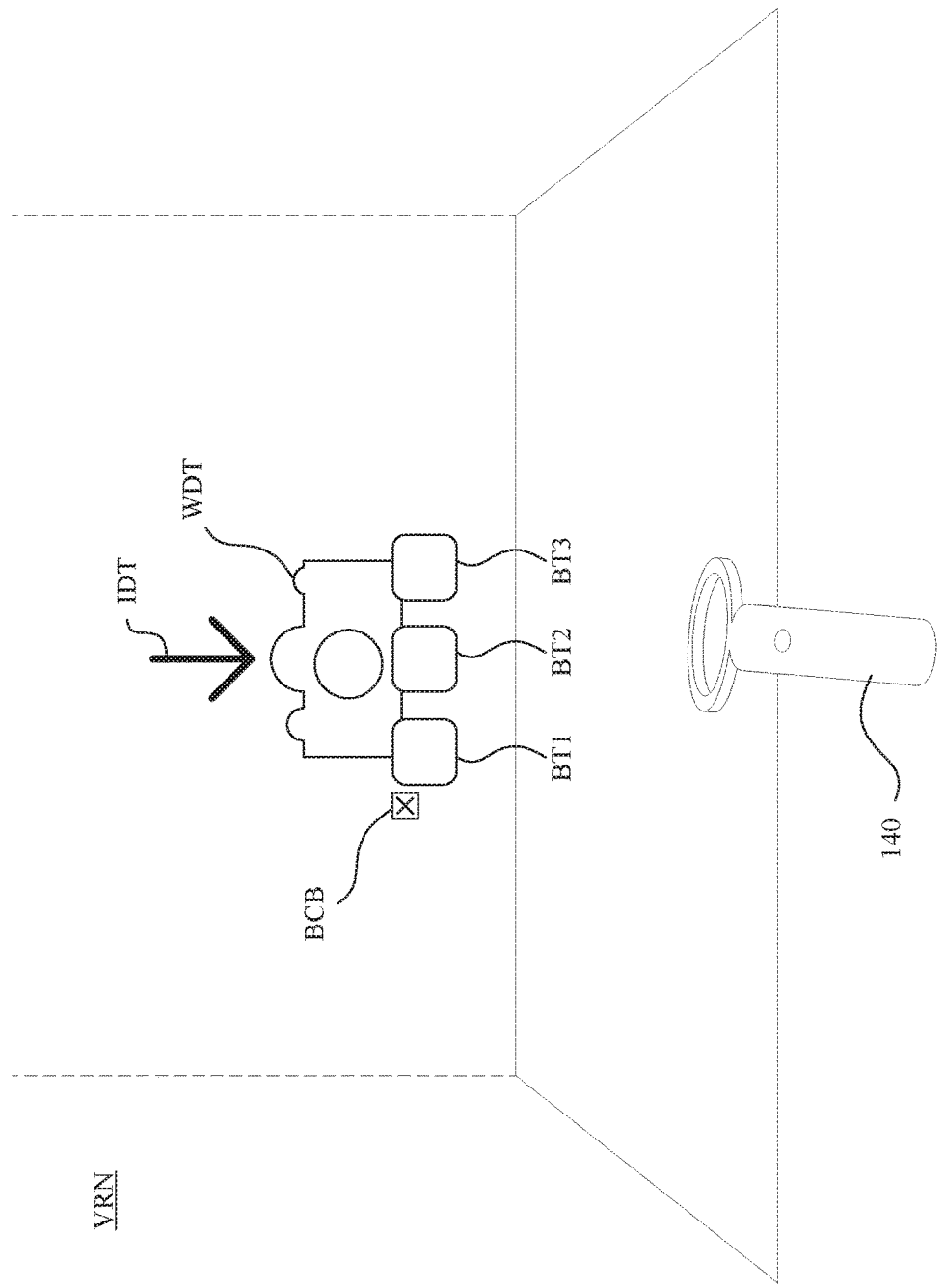
FIG. 6 illustrates an illustrative example of the VR system in accordance with one embodiment of the present disclosure.

Reference is made to FIG. 6. In one embodiment, in response to an actuation movement of the VR controller 140 corresponding to the menu button MNB for opening a menu of the camera widget WDT being sensed, the one or more processing components 110 can control the VR display device 130 to display the menu of the camera widget WDT with multiple buttons (e.g., buttons BT1-BT3) and a cancel button BCB corresponding to the camera widget WDT. In one embodiment, during this menu is displayed, the one or more processing components 110 can also control the VR display device 130 to display an indicator IDT to indicate that this menu corresponds to the camera widget WDT.

In one embodiment, the cancel button BCB is for closing the menu of the camera widget WDT. In one embodiment, the button BT1 is for editing the camera widget WDT, the button BT2 is for configuring the settings of the camera widget WDT, and the button BT3 is for removing the camera widget WDT. It should be noted that other number and functions of the buttons BT1-BT3 are within the contemplated scope of the present disclosure.

Details of the present disclosure are described in the paragraphs below with reference to a method for VR in FIG. 7. However, the present disclosure is not limited to the embodiment below.

It should be noted that the method can be applied to a VR processing device 100 having a structure that is the same as or similar to the structure of the VR processing device 100 shown in FIG. 1. To simplify the description below, the embodiment shown in FIG. 1 will be used as an example to describe the method according to an embodiment of the present disclosure. However, the present disclosure is not limited to application to the embodiment shown in FIG. 1.

It should be noted that, in some embodiments, the method may be implemented as a computer program. When the computer program is executed by a computer, an electronic device, or the one or more processing components 110 in FIG. 1, this executing device performs the method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following method, no particular sequence is required unless otherwise specified. Moreover, the following operations also may be performed simultaneously or the execution times thereof may at least partially overlap.

Furthermore, the operations of the following method may be added to, replaced, and/or eliminated as appropriate, in accordance with various embodiments of the present disclosure.

Figure 7:
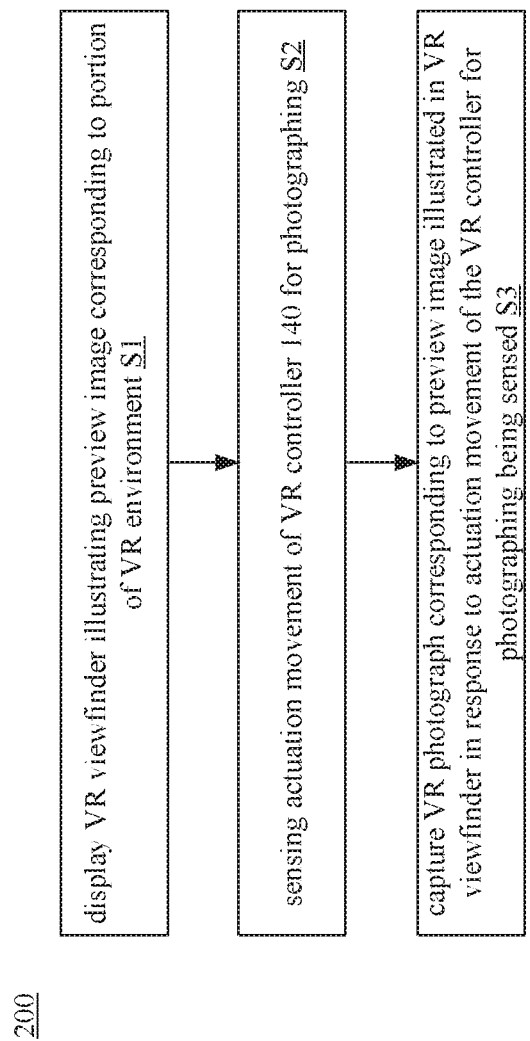
FIG. 7 is a flowchart of a method in accordance with one embodiment of the present disclosure.

Reference is made to FIGS. 1 and 7. The method 200 includes the operations below.

In operation S1, the one or more processing components 110 control the VR display device 130 to display a VR viewfinder illustrating a preview image corresponding to a portion of a VR environment.

In operation S2, the one or more processing components 110 sensing an actuation movement of a VR controller 140 for photographing.

In operation S3, the one or more processing components 110 capture a VR photograph corresponding to the preview image illustrated in the VR viewfinder in response to the actuation movement of the VR controller for photographing being sensed.

Details of this method can be ascertained with reference to the paragraphs above, and a description in this regard will not be repeated herein.

Through the operations of one embodiment described above, a user friendly camera interface in a VR environment can be implemented.

Although the present invention has been described in considerable detail with reference to certain embodiments thereof, other embodiments are possible. Therefore, the scope of the appended claims should not be limited to the description of the embodiments contained herein.

What is claimed is:

1. A method for virtual reality (VR) comprising:
displaying a VR viewfinder in a VR environment, wherein the VR viewfinder is displayed in the VR environment to identify a portion of the VR environment for photographing, and the VR viewfinder illustrates a preview image of the portion of the VR environment;
sensing a first actuation movement of a VR controller for photographing; and
capturing a VR photograph according to the preview image identified by the VR viewfinder in response to the first actuation movement of the VR controller for photographing being sensed,
wherein when the VR viewfinder is displayed in a position in the VR environment and faces a first direction, the preview image identified by the VR viewfinder is a photo preview image in the first direction corresponding to the position of the VR viewfinder under a photo mode, and
the preview image identified by the VR viewfinder is a selfie preview image in a second direction corresponding to the position of the VR viewfinder under a selfie mode, the second direction is opposite to the first direction.

2. The method as claimed in claim 1 further comprising:
sensing a second actuation movement of the VR controller corresponding to a camera widget in the VR environment;
wherein the VR viewfinder is displayed in response to the second actuation movement of the VR controller corresponding to the camera widget in the VR environment being sensed.

3. The method as claimed in claim 1 further comprising:
sensing a moving movement of the VR controller corresponding to the VR viewfinder; and
moving the VR viewfinder in response to the moving movement of the VR controller corresponding to the VR viewfinder, so that the VR viewfinder illustrates the preview image corresponding to another portion of the VR environment.

4. The method as claimed in claim 3 further comprising:
sensing a third actuation movement of the VR controller corresponding to the VR viewfinder and a certain place in the VR environment when the VR viewfinder is moving; and
locking the moving VR viewfinder at the certain place in the VR environment in response to the third actuation movement of the VR controller corresponding to the VR viewfinder and the certain place in the VR environment.

5. The method as claimed in claim 1 further comprising:
displaying the captured VR photograph in a picture frame; and
changing the photograph in the picture frame in response to a fourth actuation movement of the VR controller corresponding to the picture frame.

6. A virtual reality (VR) device comprising:
one or more processing components;
memory electrically connected to the one or more processing components; and
one or more programs, wherein the one or more programs are stored in the memory and configured to be executed by the one or more processing components, the one or more programs comprising instructions for:
controlling a VR display device to display a VR viewfinder in a VR environment, wherein the VR viewfinder is displayed in the VR environment to identify a portion of the VR environment for photographing, and the VR viewfinder illustrates a preview image of the portion of the VR environment;
sensing a first actuation movement of a VR controller for photographing; and
capturing a VR photograph according to the preview image identified by the VR viewfinder in response to the first actuation movement of the VR controller for photographing being sensed,
wherein when the VR viewfinder is displayed in a position in the VR environment and faces a first direction, the preview image identified by the VR viewfinder is a photo preview image in the first direction corresponding to the position of the VR viewfinder under a photo mode, and
the preview image identified by the VR viewfinder is a selfie preview image in a second direction corresponding to the position of the VR viewfinder under a selfie mode, the second direction is opposite to the first direction.

7. The VR device as claimed in claim 6 further comprising instructions for:
sensing a second actuation movement of the VR controller corresponding to a camera widget in the VR environment;
wherein the VR viewfinder is displayed in response to the second actuation movement of the VR controller corresponding to the camera widget in the VR environment being sensed.

8. The VR device as claimed in claim 6 further comprising instructions for:
sensing a moving movement of the VR controller corresponding to the VR viewfinder; and
moving the VR viewfinder in response to the moving movement of the VR controller corresponding to the VR viewfinder, so that the VR viewfinder illustrates the preview image corresponding to another portion of the VR environment.

9. The VR device as claimed in claim 8 further comprising instructions for:
sensing a third actuation movement of the VR controller corresponding to the VR viewfinder and a certain place in the VR environment when the VR viewfinder is moving; and
locking the moving VR viewfinder at the certain place in the VR environment in response to the third actuation movement of the VR controller corresponding to the VR viewfinder and the certain place in the VR environment.

10. The VR device as claimed in claim 6 further comprising instructions for:
controlling the VR display device for displaying the captured VR photograph in a picture frame; and
changing the photograph in the picture frame in response to a fourth actuation movement of the VR controller corresponding to the picture frame.

11. A non-transitory computer readable storage medium storing one or more programs comprising instructions, which when executed, causes one or more processing components to perform operations comprising:
- controlling a virtual reality (VR) display device for displaying a VR viewfinder in a VR environment, wherein the VR viewfinder is displayed in the VR environment to identify a portion of the VR environment for photographing, and the VR viewfinder illustrates a preview image of the portion of the VR environment;
- sensing a first actuation movement of a VR controller for photographing; and
- capturing a VR photograph according to the preview image identified by the VR viewfinder in response to the first actuation movement of the VR controller for photographing being sensed,
- wherein when the VR viewfinder is displayed in a position in the VR environment and faces a first direction, the preview image identified by the VR viewfinder is a photo preview image in the first direction corresponding to the position of the VR viewfinder under a photo mode, and
- the preview image identified by the VR viewfinder is a selfie preview image in a second direction corresponding to the position of the VR viewfinder under a selfie mode, the second direction is opposite to the first direction.

12. The non-transitory computer readable storage medium as claimed in claim 11 comprising instructions, which when executed, causes one or more processing components to further perform operations comprising:
- sensing a second actuation movement of the VR controller corresponding to a camera widget in the VR environment;
- wherein the VR viewfinder is displayed in response to the second actuation movement of the VR controller corresponding to the camera widget in the VR environment being sensed.

13. The non-transitory computer readable storage medium as claimed in claim 11 comprising instructions, which when executed, causes one or more processing components to further perform operations comprising:
- sensing a moving movement of the VR controller corresponding to the VR viewfinder; and
- moving the VR viewfinder in response to the moving movement of the VR controller corresponding to the VR viewfinder, so that the VR viewfinder illustrates the preview image corresponding to another portion of the VR environment.

14. The non-transitory computer readable storage medium as claimed in claim 13 comprising instructions, which when executed, causes one or more processing components to further perform operations comprising:
- sensing a third actuation movement of the VR controller corresponding to the VR viewfinder and a certain place in the VR environment when the VR viewfinder is moving; and
- locking the moving VR viewfinder at the certain place in the VR environment in response to the third actuation movement of the VR controller corresponding to the VR viewfinder and the certain place in the VR environment.

* * * * *